United States Patent [19]
Suiter

[11] Patent Number: 6,158,859
[45] Date of Patent: *Dec. 12, 2000

[54] WINDOW HAVING ASPHERIC, AFOCAL LENS SYSTEM PROVIDING UNIT MAGNIFICATION BETWEEN AIR AND WATER

[75] Inventor: Harold R. Suiter, Chipley, Fla.

[73] Assignee: The United States of America as represented by the Secretary of the Navy, Washington, D.C.

[*] Notice: This patent is subject to a terminal disclaimer.

[21] Appl. No.: 09/408,656

[22] Filed: Sep. 27, 1999

Related U.S. Application Data

[63] Continuation-in-part of application No. 09/120,875, Jul. 20, 1998, Pat. No. 5,997,138.

[51] Int. Cl.[7] .................................................. G02C 1/00
[52] U.S. Cl. ................................................. 351/43; 351/41
[58] Field of Search ........................ 351/41, 43; 359/642, 359/646

[56] References Cited

U.S. PATENT DOCUMENTS 5,997,138  12/1999  Suiter ........................................ 351/43
6,011,648   1/2000  Mukai et al. ............................ 359/642

Primary Examiner—Huy Mai
Attorney, Agent, or Firm—Harvey A. Gilbert; Donald G. Peck

[57] ABSTRACT

A lens system is adaptable to face masks for divers and camera and viewing windows and assures improved viewing characteristics underwater, including unit magnification and substantially perspective distortion-free viewing over a wider field of view. The system includes a first lens having a concave outer face contacting water and a concave inner face contacting a gas filled interior. A second lens spaced apart from the first lens in the interior has a convex outer surface and a flat inner surface. The concave outer face and concave inner face of the first lens and the convex outer surface and flat an inner surface of the second lens are coaxially aligned and optically oriented to afocally process and transmit light passing through them to a nodal point in the interior. At least one of the outer face, concave inner face, convex outer surface and inner surface defines an aspheric curve. A pair of such lens systems may be mounted in a face mask structure or a single modified lens system having a flat outer face may be mounted in a case for an underwater camera or in a window for underwater viewing.

6 Claims, 3 Drawing Sheets

WINDOW HAVING ASPHERIC, AFOCAL LENS SYSTEM PROVIDING UNIT MAGNIFICATION BETWEEN AIR AND WATER

CROSS REFERENCE TO RELATED APPLICATION

This is a continuation in part of copending U.S. patent application entitled "Unit Magnification Water-Air Viewing Device" by H. Suiter, U.S. Patent and Trademark Office Ser. No. 09/120,875 (NC 78,808), filed Jul. 20, 1998, now U.S. Pat. No. 5,997,138 and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to diving masks and camera and viewing windows. In particular, this invention relates to underwater diving masks and camera cases having the improved underwater viewing characteristics of unit magnification and perspective effects approaching normal unaided vision in air.

A well-known phenomenon that creates angular magnification and perspective distortion is caused by the medium transition from water to air through a plane-parallel layer of tempered glass or plastic (see *Human Underwater Vision: Physiology and Physics* by J. S. Kinney, pg. 83–106). Such transitions are common in diver face-masks or flat optical windows used to protect a camera and electronic parts of cameras from the water environment. This effect is also visible looking down into still water and can be seen to be a function of the change in medium rather than the material of the optical window.

This effect can be derived from Snell's law of refraction:

$$n_{water} \sin(\theta_{water}) = n_{window} \sin(\theta_{window}) = n_{air} \sin(\theta_{air})$$

where $n_{water}$ is the index of refraction of water and $\theta_{water}$ is the angle from the normal of the surfaces where the light ray changed media between water and the window. The other variables are defined similarly. The indices of refraction are usually slightly adjusted so that the index of refraction in air becomes by definition exactly unity.

The window material turns out to be unimportant and the net effect of Snell's law in the transition from water to air is that there is a paraxial angular magnification of about 1.34 and binocular triangulation is subverted. This makes objects look nearer than they would look if they were perceived through air (i.e., perspective distortion). The magnification problem is particularly acute when attempting to view objects off-center in the optical system. There is an angle at which objects can no longer be seen from the air side of the window. Theoretically it is over 48 degrees but practically it is less than 45 degrees. Reports of 50-degree or greater fields of view result from slight motions of the head. Light having incidence angles greater than the value of somewhere between 48 and 49 degrees is totally reflected at the interface.

While divers have used flat face-masks for many years with good success, there are situations where correction of the above problems would prove to be beneficial. Divers having to do work underwater requiring a great deal of hand-eye coordination, such as underwater welding or salvaging, could enhance the fine control of their hands with their vision behaving as it does in air. The invention to be described in detail below performs the desirable demagnification required to achieve this, and does so without adding net optical power.

The prior art has failed in its attempted to achieve this desirable result. The invention of U.S. Pat. No. 2,730,014 featured a two-lens structure similar to the one described here. The widest field-of-view for the mask embodiment of this patent was restricted to plus or minus 26 degrees, as determined by modern modeling. In addition, the design did not employ an aspheric surface to correct off-axis aberrations. In another effort, the invention of U.S. Pat. No. 3,040,616 provided an underwater goggle that also had a paraxial unit magnification about equal to unity. It had severe off-axis aberrations of astigmatism and field curvature, however, reaching a full degree or more of blurring at 38 degrees. As long as mask users held the object rigidly at the center of the field-of-view of their goggles, they probably perceived adequate performance, but the off-axis performance limited this otherwise excellent design to the central ten degrees or so.

More recently, U.S. Pat. Nos. 5,359,371 and 5,523,804 have disclosed a thin negative singlet design. However, the claims of optical unit-magnitude performance of this device are incorrect. No thin lens of the optical powers specified in the patents (when placed only a few inches before the eyes) result in unit magnification. Perhaps the design of the patents relies on subtle and complex psycho-visual cues to partially correct perspective errors, but the fundamental optical design does not do this correction. The design of the patents also adds a small amount of negative optical power to the system, which can be accommodated by young viewers, but for older people pushes the limit of close-focus outward even farther than presbyopia allows in air. Corrective lenses can be placed in contact with the flat inner surface, but doing so would destroy any benefits of the very slightly curved outer surface.

More common are the attempts to correct for the intense negative power of dome-style lenses. Inventors of such devices reason correctly that domes are not limited in field-of-view like flat lenses. However, a dome small enough to fit over each eye individually has much stronger optical power than the normal eye is capable of refocusing by accommodation; a lens must be added internally to add some positive power to the system. Thus, the user recovers an approximately afocal beam. Inventions exemplifying this principle are disclosed in U.S. Pat. Nos. 3,672,750 and 5,625,425. The inventions of these patents are designed for widening the field-of-view, however, and not unit magnification.

Thus, in accordance with this inventive concept, a need has been recognized in the state of the art for a lens system adaptable to face masks for divers and camera and viewing windows that assures improved viewing characteristics underwater, including unit magnification and good perspective rendering over a wide field of view.

SUMMARY OF THE INVENTION

The present invention is directed to providing a lens system creating unit magnification and improved perspective effects across a water-gas interface. The lens system includes a first lens that has a concave or flat outer face contacting water and a concave inner face contacting gas in a gas-filled interior. A second lens is spaced apart from the first lens in the interior and has a convex outer surface and a flat or concave inner surface. The concave or flat outer face and concave inner face of the first lens and the convex outer surface and flat or concave inner surface of the second lens are coaxially aligned and optically oriented to converge light passing through them to a common center in the interior volume. At least one lens surface of the system defines an aspheric curve.

An object of the invention is to provide an afocal lens system that does not magnify or diminish the apparent object size when used underwater looking out of an air pocket.

Another object of this invention is to provide a diving-mask lens for divers with normal vision that has improved viewing characteristics underwater including unit magnification and the similar perspective effects to viewing the object using normal unaided vision in air.

Another object of this invention is to provide a diving mask lens that has improved viewing characteristics underwater, including unit magnification and the similar perspective effects to viewing the object without using the lens in air and also allows optical correction to be placed within the mask without materially affecting unit-magnification performance.

Another object of this invention is to provide a window-lens assembly for looking from air into a container of water, such as an aquarium, with the same perspective as if the water volume were viewed in air.

Another object of this invention is to provide a window-lens assembly used in a dry box underwater that protects the electronics, mechanical parts, and/or film emulsions of a camera to allow use of the camera essentially the same way as it would be used in air outside the dry box, and with the same magnification.

These and other objects of the invention will become more readily apparent from the ensuing specification when taken in conjunction with the appended claims.

DESCRIPTION OF THE PREFERRED EMBODIMENTS

Figure 1:
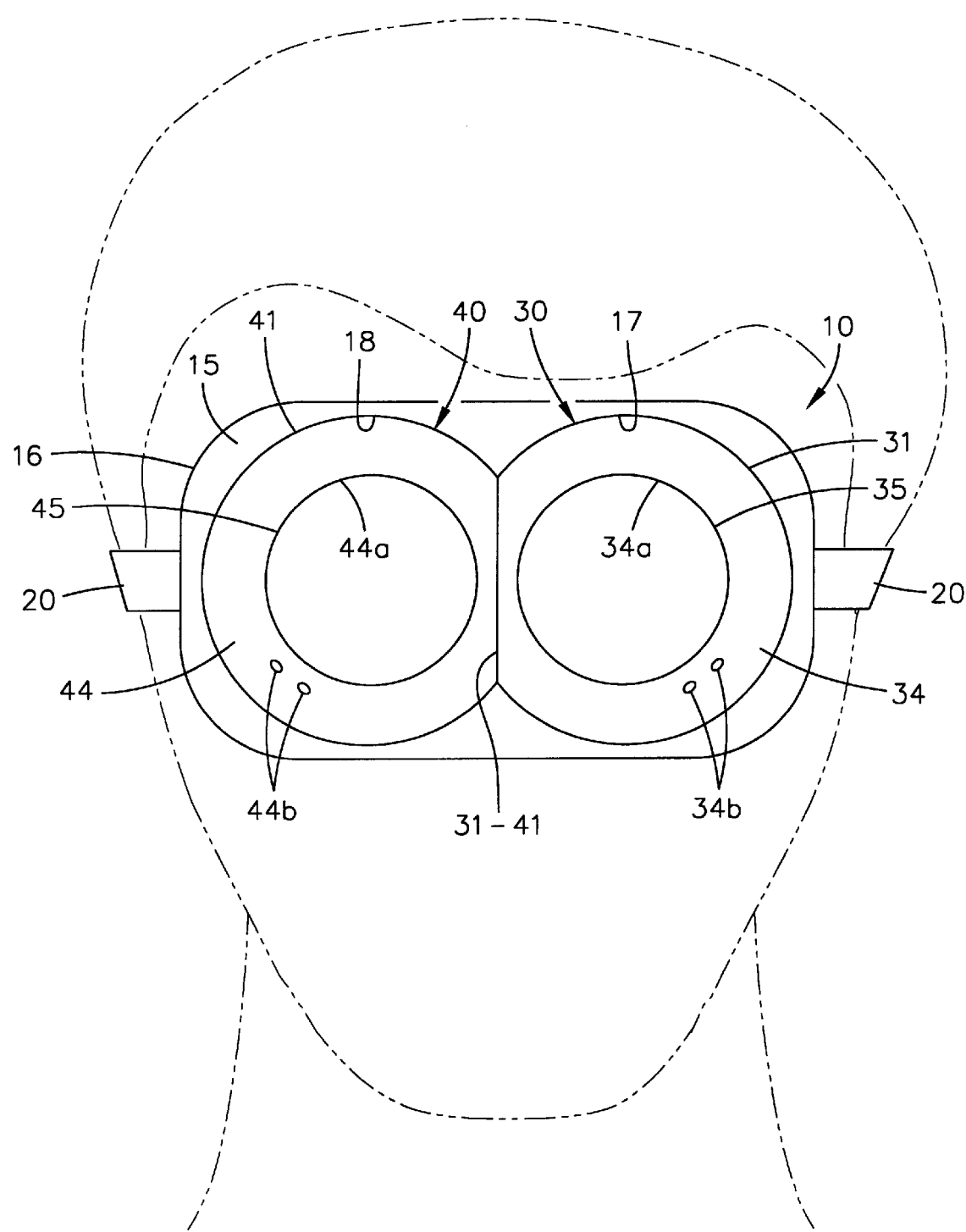
FIG. 1 is a front view of a diving mask including left-eye and right-eye lens systems of this invention.
Figure 2:
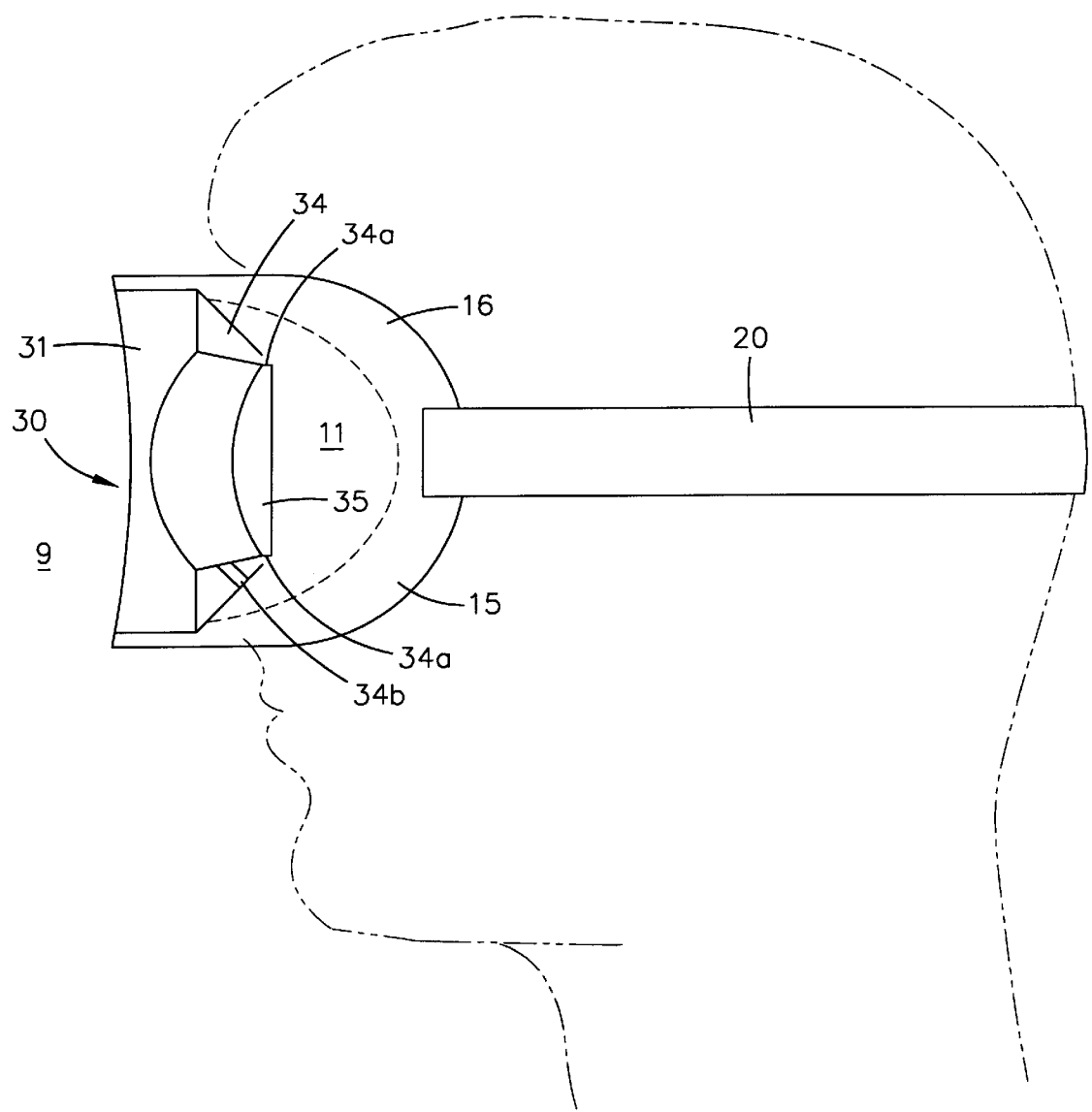
FIG. 2 is a side view, partially in cross section of the diving mask of FIG. 1.

Referring to FIGS. 1 and 2 of the drawings, diver's mask 10 has lens housing 15 that is appropriately shaped from a suitable compound, such as rubber. Its peripheral lip portion 16 is flexible to pliably accommodate the facial features of a diver. An elastic strap 20 attached to opposite sides of housing 15 is stretched and fitted about the head of the diver to snugly seat lip portion 16 against the facial features so that interior 11 of mask 10 is sealed from ambient water 9.

Left and right eye lens systems 30 and 40 respectively have outer lenses 31 and 41 respectively secured in recesses 17 and 18 in housing 15. The recesses have diameters slightly less than 84 mm, an exemplary diameter of outer lens 31 and 41. Such lens systems typically may have 63 mm eye to eye separations (interocular distance), but this dimension may be adjusted to individual divers. However, only a few differently dimensioned masks need to be made to accommodate most divers since the optical axis may be moved a few millimeters without ill effect.

Housing 15 may be slightly stretched to receive outer lenses 31 and 41 which may be secured by suitable bonding agents. If the dimensions of outer lenses 31 and 41 require them to be truncated to fit between the eyes, a suitable optical adhesive is applied along juncture 31–41 of lenses 31 and 41 to hold them together and to seal interior volume 11.

The arrangements of the outer lenses may not necessarily have the outer lenses truncated. It just so happens that with the elements dimensioned as disclosed herein, the truncated design was appropriate. In addition, other modifications within the scope of this invention may be different than shown. For example, the outer lenses may be entirely separated and the mask may have a pair of separated lens systems tailored as goggles. Also, a purge valve and flexible shell for the nose could be provided in the mask. These features allow purging of fluids from the mask and pressure compensation of the inner ears, respectively.

Combination spacer-sealer structures 34 and 44 are included in lens systems 30 and 40, respectively. They may be individually formed and appropriately bonded in housing 15 of masks 10 or they may be integrally formed with housing 15 of mask 10. Rings 34 and 44 have an essentially annular shape, and each has a mounting surface 34a or 44a to respectively support an inner lens 35 or 45. A suitable adhesive coated on surfaces 34a and 44a respectively holds each inner lens 35 and 45 in an aligned orientation and specific spacing with respect to its associated outer lens 31 or 41. Rings 34 and 44 may be provided with one or more openings 34b or 44b. These openings couple the spaces between outer lens 31 and inner lens 35 and between outer lens 41 and inner lens 45 to the rest of interior volume 11.

Optionally, the interior volume between the lenses might be isolated from the wet air in front of the eyes and filled with dry nitrogen to avoid fogging. Such lenses would be useful for shallow water diving where pressure differentials would not be great. A further modification could have the interior volume pressure coupled to the volume in front of the eyes. In this latter configuration, mounting rings 34 and 44 may be screwed onto outer lens 31 and 41, respectively, or otherwise be removably mounted to allow cleaning and drying between dives.

Figure 3:
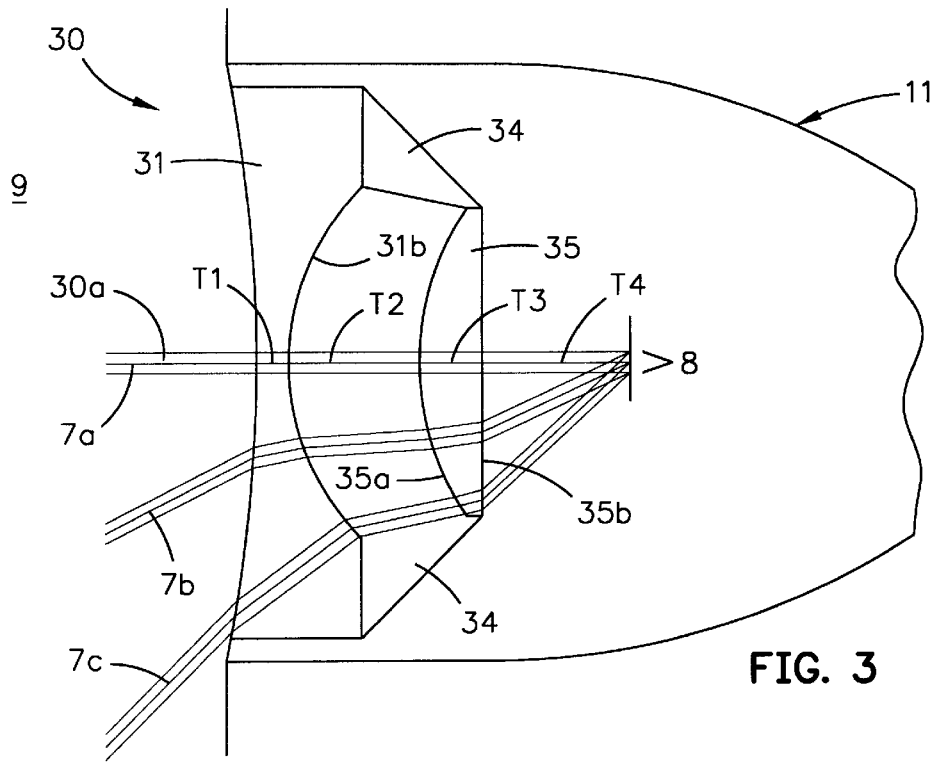
FIG. 3 elaborates on details of the side view of FIG. 2.

Referring to FIG. 3, the elements of left eye system 30 are shown in greater detail. It is to be understood that the constituents of right eye system 40 are virtually the same and function the same with respect to the right eye as left eye system 30 does for the left eye. Systems 30 and 40 assure better viewing characteristics underwater, including unit magnification II and the similar perspective effects to viewing an object in air without using the lens.

Ambient water 9 is on the left side of outer lens 31 of left eye system 30 and gas (air) fills interior 11 on the right side of outer lens 31 inside housing 15. Exemplary light-ray bundles 7a, 7b, and 7c are incident on outer lens 31 from ambient water 9 at 0, −20, and −40 degrees from optical axis 30a, respectively. The eye looks to the left. This range of incidence extends above and below optical axis 30a as well as angles to the left and right which extend to either side. For clarity in the drawings, other angles have been suppressed.

Outer lens 31 is provided with outer face 31a which has a negative radius of curvature R1. A negative radius of curvature has its center of curvature to the left of the intersection of outer face 31a with optical axis 30a (I. e., the vertex). Outer lens 31 has concave inner face 31b shaped as a prolate spheroid, an aspheric curve.

Inner lens 35 is shaped to present concave outer surface 35a and flat inner surface 35b. Concave inner face 31b and concave outer surface 35a have positive radii of curvature, R2 and R3, respectively, that have their centers of curvature to the right of the vertex (flat inner surface 35b has an infinite radius of curvature R4).

Outer lens 31 has a thickness T1 across its center along optical axis 30a and inner lens 35 has a thickness T3 across its center along optical axis 30a. Inner face 31b of outer lens 31 is separated from outer surface 35a of inner lens 35 a distance T2 of airspace along optical axis 30a, and inner surface 35b is spaced a distance T4 of airspace along optical axis 30a from nodal point 8. Nodal point 8 is the crossing point of ray bundles somewhat behind the iris of the eye so that a swiveling eye will encounter the ray bundles on a spherical shell at their proper locations. (In the case of a camera described below, this nodal point 8 is substantially the same as aperture stop or aperture-stop pupil 8'.) Concave outer face 31a, concave inner face 31b, convex outer surface 35a and flat inner surface 35b are coaxially aligned on axis 30a and optically oriented to collectively converge light passing through them to nodal point 8. Outer lens 31 and inner lens 35 are polycarbonate, although other materials may be used for different applications.

Other parameters for lens systems 30 and 40 are:

| Medium | Radius | Thickness | Conic constant |
|---|---|---|---|
| Seawater | | Infinity | |
| | R1 −165.454 mm | | K1 0.0 |
| Polycarbonate | | T1 3 mm | |
| | R2 38.204 mm | | K2 −0.5421 |
| Air | | T2 19 mm | |
| | R3 46.270 mm | | K3 0.0 |
| Polycarbonate | | T3 9 mm | |
| | R4 infinity | | K4 0.0 |
| Air | | T4 25 mm | |
| | (nodal point) | | |

The values K1, K2, K3, and K4 are the conic constants that are equal to the negative of the eccentricity squared. Zero indicates a spherical surface; −1 indicates a paraboloid, etc. Outer concave face 31a, outer concave surface 35a, and inner flat surface 35b are spherically-shaped (inner flat surface 35b is considered to have an infinite radius of curvature). The negative conic constant of inner concave face 31a between 0 and −1 indicates that it is a prolate spheroid.

The indices of refraction that were needed to generate the above prescription are listed below. The indices of refraction characteristic of seawater, rather than fresh water, were used, and all indices were scaled so the index of air at standard temperature and pressure is defined as unity. No correction for air at diving pressure was made, but since the difference between the index of air and vacuum is 3 parts in $10^4$, corrections are minor.

The indices of refraction and wavelengths for face mask are:

| Wavelengths | 0.480 μm | 0.550 μm | 0.620 μm |
|---|---|---|---|
| Seawater | 1.344 | 1.341 | 1.339 |
| Polycarbonate | 1.601 | 1.590 | 1.583 |
| Air | 1.000 | 1.000 | 1.000 |

Concave front face 31a and flat rear surface 35b are not the only shapes possible. Front face 31a may be flat, inner surface 35b could be concave, and outer surface 35a could be an aspheric curve. If lower image quality is tolerable, no aspheric curves in any embodiments need be used. Various characteristics can be optimized more fully, e. g., higher field-of-view or superior correction of lateral chromatic aberration.

Figure 4:
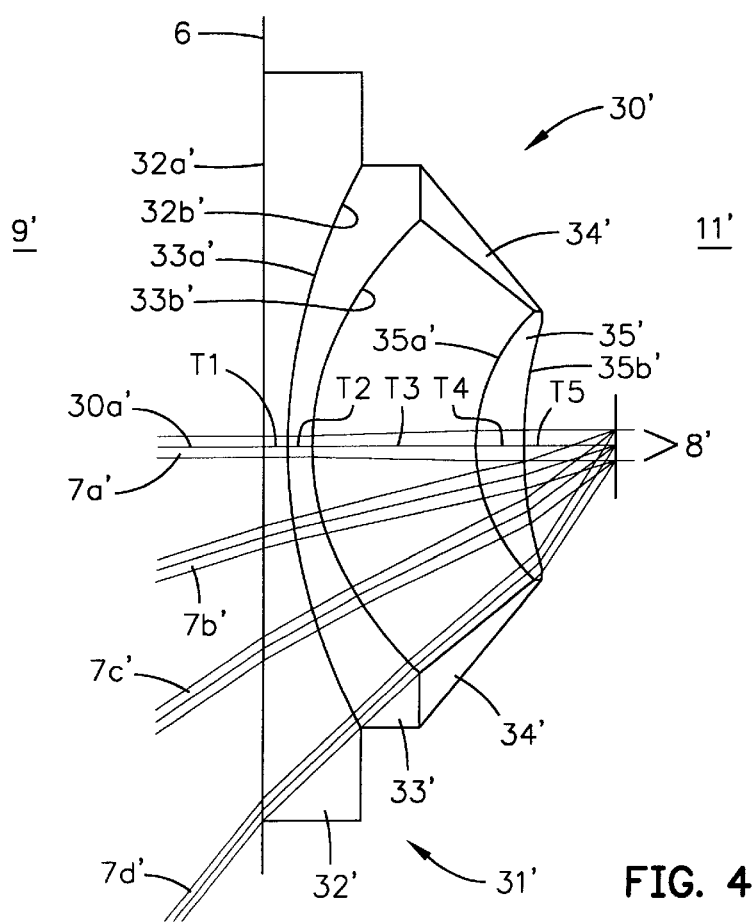
FIG. 4 is a side view, partially in cross section of a window-lens system for an underwater dry box for cameras.

An afocal lens for a camera, is shown in FIG. 4. It is not necessary to have such a large eye relief since there is no requirement to have room for eyelashes or a nodal point at the center of the eyeball; furthermore, the space between lens elements can be increased because the compactness requirement no longer is needed for fitting the lens system to the head. Referring to FIG. 4, camera and viewing window lens system 30' has outer and inner lenses 31' and 35' designed for a camera case or a viewing area that is filled with gas 11', such as air. Transparent window, or port 6 contacts water medium 9' and is depicted as a line in the figure to dispense with superfluous information regarding refractions associated with impinging bundles of light 7a', 7b', 7c' and 7d'.

Aperture-stop pupil 8' is 6 mm in diameter to adequately cover typical apertures of a fast, wide-angle, video-camera lens. Impinging bundles of light 7a', 7b', 7c' and 7d' refer to ray bundles from 0, −17, −34, and −51 degrees respectively. Bundles from positive angles and left and right angles are suppressed to avoid cluttering the drawings. Outer lens 31' is divided into two lens portions 32' and 33' each made from different glass types to better correct chromatic aberration. The glass used for portion 32' is standard borosilicate crown BK7 by Schott Glass Technologies of Duryea, Pa. and has thickness T1 measured across its center along optical axis 30a'. Inner lens 35' also is BK7 to thickness T4 across its center along optical axis 30a'. Portion 33' is durable flint glass F2, also by Schott, to thickness T2 across its center along optical axis 30a'. Other types of glass may be used with slightly different sets of parameters; however, BK7 and F2 were used because they are relatively cheap and chemically resistant.

Inner face 33b' of outer lens 31' is separated from outer surface 35a' of inner lens 35' a distance T3 of airspace along optical axis 30a'. Inner surface 35b' is spaced T5 of airspace from aperture-stop pupil 8' along optical axis 30a. Flat outer face 32a', concave inner face 33b', convex outer surface 35a' and concave inner surface 35b' are coaxially, aligned on optical axis 30a'. They are optically oriented to converge light passing through them to aperture-stop pupil 8'.

Since outer lens 31' has two lens portions 32' and 33' made from two glass types BK7 and F2, an additional inside face 32b' is created on portion 32 and a mating inside surface 33a' is created on portion 33. Inside face 32b' and inside surface 33a' may be suitably joined along their contiguous surfaces. Outer face 32a' is flat and can be coupled to flat window 6, and it has an infinite radius of curvature; inside face 32b' and inside surface 33a' located between portions 32 and 33 are spherically-shaped; inner face 33b' is an aspheric surface, e. g., prolate spheroid; and outer surface 35a' and inner surface 35b' of inner lens 35' are spherically-shaped. Flat surface 32a' has radius R1 of infinity, radius R2 of inside face 32b' and inside surface 33a' is positive, radius R3 of inner face 33b' is positive, radius R4 of outer surface 35a' is positive and the radius R5 of inner surface 35b' is positive.

Typical lens parameters of camera and viewing lens system 30' are:

| Medium    | Radius       | Thickness       | Conic constant |
|-----------|--------------|-----------------|----------------|
| Seawater  |              | Infinity        |                |
|           | R1 Infinity  |                 | K1 0.0         |
| Schott BK7|              | T1 5 mm         |                |
|           | R2 123.13 mm |                 | K2 0.0         |
| Schott F2 |              | T2 5 mm         |                |
|           | R3 54.82 mm  |                 | K3 −0.567      |
| Air       |              | T3 35 mm        |                |
|           | R4 39.10 mm  |                 | K4 0.0         |
| Schott BK7|              | T4 10 mm        |                |
|           | R5 89.33 mm  |                 | K5 0.0         |
| Air       |              | T5 20 mm        |                |
|           |              | (aperture stop) |                |

Some adjustment of the distance T5 would be necessary to match the entrance pupil tilts characteristic of very wide angle camera lenses. At lower angles, this adjustment is less critical.

The indices of refraction for the camera-viewing window design are:

| Wavelengths | 0.480 μm | 0.550 μm | 0.620 μm |
|-------------|----------|----------|----------|
| Seawater    | 1.344    | 1.341    | 1.339    |
| Schott BK7  | 1.523    | 1.519    | 1.516    |
| Schott F2   | 1.633    | 1.624    | 1.617    |
| Air         | 1.000    | 1.000    | 1.000    |

In accordance with the novel features of this invention, the limitations of previous attempts at making unit-magnification lenses are overcome. The prior art has faltered partially because of the intuitive notion that the outer surface facing the ambient medium should be approximately concentric with the eye or entrance pupil of the camera (i.e., bulge outward) to achieve aplanatism, see for example the above referenced patent to Simpson. The lenses of diver's mask 10 contradicts this so-called common sense idea by reversing the radius of curvature of toward significant concavity. This concavity is much greater than the shallow concavity alluded to in the above referenced patent to Nolan, and results from using a variation of the inverted Galilean telescope as a beginning design. Furthermore, the asphericity of inner face 31a of outer lens 30 corrects off-axis aberrations superior to Simpson. Using polycarbonate lens materials allows partial correction of lateral chromatic aberration that troubles even flat windows.

In camera and viewing window lens system 30', outer face 32a' is left flat, but asphericity of inner face 33b' provides adequate aberration correction out to an angle of 51 degrees. Outer face 32a' is flat so that it can be attached to window 6 in a dry box, either by using transparent adhesive or an optical couplant gel or grease. This feature is especially important if the dry box does not have a pressure-equalization system and must rely on a thick, flat window to hold pressure. Existing camera lenses designed for use in air may be used with their entrance pupils at the position of the aperture stop.

If correction of vision is needed in lens system 30 (and 40), a single, thin lens having a plane surface on one side may be adhered to flat inner surface 35b. The diver's prescription is ground and polished on the other side.

The disclosed components and their arrangements as disclosed herein all contribute to the novel features of this invention. These novel features more reliably and effectively improve viewing characteristics underwater, including unit magnification and substantially perspective distortion-free viewing over a wider field of view. Other components of the lens systems might necessarily have to be tailored for other applications, yet such modifications will be within the scope of this inventive concept. For example, different lens materials and/or gasses could be used to better perform different tasks without departing from the scope of this invention.

Furthermore, having this disclosure in mind, one skilled in the art to which this invention pertains will select and assemble suitable components for the lens systems from among a wide variety available in the art and appropriately utilize them to satisfactorily function as intended. Therefore, the disclosed arrangement is not to be construed as limiting, but rather, is intended to demonstrate this inventive concept.

It should be readily understood that many modifications and variations of the present invention are possible within the purview of the claimed invention. It is to be understood that within the scope of the appended claims the invention may be practiced otherwise than as specifically described.

I claim:

1. A lens system for underwater camera and viewing providing unit magnification and corrected aberrations over a wide field of view comprising:

first lens having a flat outer face to contact a water medium and a concave inner face to contact gas; and second lens spaced apart from said first lens in said interior, said second lens having a convex outer surface and a concave inner surface, said flat outer face, said concave inner face, said convex outer surface and said concave inner surface being coaxially, aligned and optically oriented to afocally transmit light passing through said flat outer face, said concave inner face, said convex outer surface and said concave inner surface to an aperture-stop pupil, and said concave inner face having a negative conic constant.

2. A lens system according to claim 1 in which said first lens has a first portion provided with said flat outer face and a spherically-shaped inside face and a second portion provided with a spherically-shaped inside surface conforming to said spherically-shaped inside face and said concave inner face.

3. A lens system according to claim 2 in which said concave inner face has a prolate spheroid shape, and said outer surface and inner surface are spherically-shaped and have positive radii of curvature.

4. A lens system according to claim 3 in which said first portion of said first lens and said second lens are borosilicate crown glass, said second portion of said first lens is flint glass, seawater is in contact with said flat outer face, and said gas is air.

5. A lens system according to claim 4 in which said unit magnification and corrected aberrations are provided over a field of view of up to plus and minus 51° from an optical axis aligned with said outer face, said inner face, said outer surface, and said inner surface.

6. A lens system according to claim 5 in which said outer face is flat, said spherically-shaped inside face and said spherically-shaped inside surface have a radius of curvature of 123.11 mm, said outer surface has a radius of curvature of 39.10 mm, and said inner surface has a radius of curvature of 89.33 mm.

* * * * *